(12) United States Patent
Lee

(10) Patent No.: US 9,872,239 B2
(45) Date of Patent: Jan. 16, 2018

(54) METHOD AND APPARATUS FOR OPERATION OF MULTI-SIM DEVICE

(71) Applicant: Samsung Electronics Co., Ltd., Gyeonggi-do (KR)

(72) Inventor: Jun-Kyoung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/343,745

(22) Filed: Nov. 4, 2016

(65) Prior Publication Data
US 2017/0359772 A1    Dec. 14, 2017

(30) Foreign Application Priority Data

Jun. 14, 2016 (KR) .......................... 10-2016-0074060

(51) Int. Cl.
*H04M 1/00* (2006.01)
*H04B 1/38* (2015.01)
*H04W 48/16* (2009.01)
*H04W 76/04* (2009.01)
*H04W 88/06* (2009.01)

(52) U.S. Cl.
CPC ......... *H04W 48/16* (2013.01); *H04W 76/048* (2013.01); *H04W 88/06* (2013.01)

(58) Field of Classification Search
CPC . H04W 28/042; H04W 28/044; H04W 68/00; H04W 68/02; H04W 72/1215; H04W 74/085; H04W 76/048; H04W 88/06; H04M 15/7556

USPC ... 455/343.1, 343.5, 552.1, 553.1, 558, 574; 370/311

See application file for complete search history.

(56) References Cited

U.S. PATENT DOCUMENTS

| 8,626,179 | B2 * | 1/2014 | Ngai ................. H04W 72/1215 455/558 |
| 8,787,262 | B2 * | 7/2014 | Dhanda .................... H04W 4/06 370/328 |
| 9,119,172 | B2 * | 8/2015 | Ponukumati ...... H04W 52/0238 |
| 9,408,183 | B2 * | 8/2016 | Chirayil ............... H04W 68/02 |
| 2013/0225211 | A1 | 8/2013 | Lebreton et al. |
| 2015/0163827 | A1 | 6/2015 | Ekici |
| 2015/0296520 | A1 | 10/2015 | Batchu et al. |

* cited by examiner

Primary Examiner — Quochien B Vuong
(74) Attorney, Agent, or Firm — The Farrell Law Firm, P.C.

(57) ABSTRACT

Methods, devices, and systems are disclosed for allocating the Radio Frequency (RF) resources of a multi-Subscriber Identification Module (SIM) device among multiple installed SIMS to receive their respective paging signals. In one embodiment, a method comprises generating a paging pattern of the first SIM, detecting a first collision between Radio Frequency (RF) resource allocations to the first SIM and the second SIM for receiving the paging signal, wherein RF resources are not allocated to the first SIM in the collision, and allocating the RF resources to the first SIM or the second SIM based on the generated paging pattern of the first SIM after the first collision.

20 Claims, 9 Drawing Sheets

METHOD AND APPARATUS FOR OPERATION OF MULTI-SIM DEVICE

PRIORITY

This application claims priority under 35 U.S.C. § 119(a) to Korean Patent Application Serial No. 10-2016-0074060, which was filed in the Korean Intellectual Property Office on Jun. 14, 2016, the contents of which are incorporated herein by reference.

BACKGROUND

1. Field of the Disclosure

The present disclosure generally relates to a method and an apparatus for a multi-Subscriber Identification Module (SIM) device and, more particularly, to a method and an apparatus for allocating Radio Frequency (RF) resources to the multiple SIMs in a multi-SIM device for each SIM to receive its paging messages.

2. Description of the Related Art

Terminals that communicate with other devices through wireless signals, for example, laptop computers, Personal Digital Assistants (PDAs), mobile or cellular phones, and other devices are widely used, and use various channels for different operation modes. It has become increasingly important to reserve and allocate network resources, such as bandwidth, for consumers who use power-intensive/communication-intensive applications that are executed in the terminals and require continuous network access. When terminals have limited power (for example, when using a rechargeable battery pack), the terminals, accordingly, may operate in various modes in order to extend the operation life of the terminal.

For example, operation modes for a terminal may include a "connected" mode and an "idle" mode. In the connected mode, the terminal may actively exchange data (for example, voice or data calls or sessions) with one or more access nodes (for example, base stations, node B, femto cell, and the like) within a wireless communication system. In the idle mode, a client terminal may monitor control channels, such as the Paging Channel (PCH), to receive any paging messages directed to it. A paging message may warn the terminal of an incoming voice or data call. In response to such a paging signal, the terminal switches from the idle mode to the connected mode in order to receive the incoming voice or data call.

Power consumption of the terminal in the idle mode is lower than power consumption in the connected mode. However, the terminal still consumes power to monitor the paging channel while in the idle mode. In order to reduce power consumption in the idle mode, terminals operate in a Discontinuous Reception (DRX) mode, in which the terminal periodically monitors the paging channel instead of continuously monitoring the paging channel, thereby reducing power consumption. In the DRX mode, the terminal is in a "sleep" state or a "wake-up" state. The terminal "wakes up" to monitor and process the paging channel to receive any paging messages and, if there is no request for additional communication, the terminal switches from the "wake-up" state to the "sleep" state. The "sleep" state and the "wake-up" state repeat according to a predetermined period. One "DRX cycle" refers to one period of "sleep" and "wake-up" states.

Originally, a Subscriber Identification Module (SIM) was used to identify a single user of the terminal by the network, and was manufactured in a card type and inserted into the terminal. When the user of a terminal is changed to a new user but the same SIM remains inserted into the terminal, the network still identifies the user of the terminal as the old user, instead of the new user.

Now, some terminals include two or more SIMs. A terminal including two or more SIMs may be referred to as a dual-SIM terminal or a multi-SIM terminal. The network recognizes each of the operations of a plurality of SIMs included in a single terminal as an individual user operation and each of the plurality of SIMs may access different individual networks or base stations.

SIMs in a multi-SIM terminal share the RF resources of the terminal such as circuit(s), transmit/receive path(s), and other hardware and/or software resources used for processing transmitted/received signals. Some multi-SIM terminals have a plurality of RF resources to allow the plurality of SIMs to simultaneously communicate, and some multi-SIM terminals allocate RF resources to one of a plurality of SIMs at a time; that is, they allow only one SIM to communicate in an allocated time period.

However, sharing RF resources may cause collisions, e.g., a time period allocated to more than one SIM. For example, as discussed above, each of the SIMs repeats a sleep and wake-up DRX cycle. If the same RF resources are allocated to two or more SIMs, a collision between RF resource allocations is generated when the SIMs enter the wake up state at the same time. When such a collision is generated, at least one SIM cannot monitor the paging channel and, accordingly, misses its paging signal transmitted from the base station. Typically, in response to such a collision, the base station repeatedly transmits the paging signal. However, if a particular SIM has successive collisions and cannot receive the RF resources continuously, the SIM will miss all the repeatedly transmitted paging signals and, accordingly, may miss an incoming data or voice call.

Accordingly, methods, devices, and systems are required to efficiently allocate the RF resources of a multi-SIM terminal between the SIMs installed in the multi-SIM device to receive their respective paging messages.

SUMMARY

An aspect of the present disclosure provides a method of efficiently allocating RF resources between SIMs in a multi-SIM device to receive their respective paging messages.

Another aspect of the present disclosure provides a multi-SIM device for efficiently allocating RF resources between SIMs in a multi-SIM device to receive their respective paging messages.

Another aspect of the present disclosure provides a chip for efficiently allocating RF resources between SIMs in a multi-SIM device to receive their respective paging messages.

According to an aspect of the present disclosure, a method of receiving a paging signal by a multi-Subscriber Identification Module (SIM) device including at least a first SIM and a second SIM is provided, the method including generating a paging pattern of the first SIM, detecting a first collision between Radio Frequency (RF) resource allocations to the first SIM and the second SIM for receiving the paging signal, wherein RF resources are not allocated to the first SIM in the collision, and allocating the RF resources to the first SIM or the second SIM based on the generated paging pattern of the first SIM after the first collision.

According to another aspect of the present disclosure, a multi-Subscriber Identification Module (SIM) device including at least a first SIM and a second SIM is provided, the multi-SIM device including a transceiver, a memory, and a processor coupled to the transceiver and the memory, wherein the processor is configured to, generate a paging pattern of the first SIM, detect a first collision between Radio Frequency (RF) resource allocations to the first SIM and the second SIM for receiving their respective paging signals, wherein the RF resources are not allocated to the first SIM at a time of the first collision, and allocate the RF resources to the first SIM or the second SIM based on the generated paging pattern of the first SIM after the first collision.

According to another aspect of the present disclosure, a chip is provided for a multi-Subscriber Identification Module (SIM) device including at least a first SIM and a second SIM, the chip configured to generate a paging pattern of the first SIM, detecting a first collision between Radio Frequency (RF) resource allocations to the first SIM and the second SIM for receiving their respective paging signals, wherein the RF resources are not allocated to the first SIM at a time of the first collision, and allocate the RF resources to the first SIM and the second SIM based on the generated paging pattern of the first SIM after the first collision.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

The advantages and features of the present disclosure will become apparent by referring to embodiments of the present disclosure as described below in detail in conjunction with the accompanying drawings. However, the present disclosure is not limited to the embodiments set forth below, but may be implemented in various different forms, as one of ordinary skill in the art would know. The following embodiments are provided only to inform those skilled in the art of the scope of the present disclosure, and the present disclosure is limited only by the scope of the appended claims.

Although the terms "first" and "second" are used to describe various elements, these terms are used merely to distinguish one element from another element. Accordingly, a first element mentioned below can be designated a second element within the scope of the present disclosure.

Figure 1:
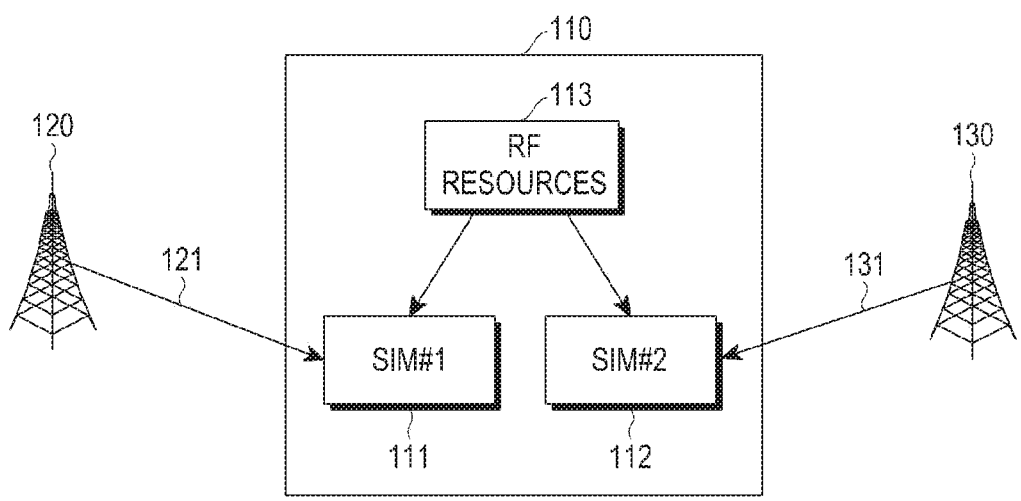
FIG. 1 illustrates an example of communications between base stations and a multi-SIM device.

FIG. 1 illustrates two base stations 120 and 130 and a multi-SIM device 110. Multi-SIM device 110 may be referred to as, for example, a multi-SIM terminal, a multi-SIM User Equipment (UE), or a multi-SIM mobile station.

Referring to FIG. 1, the multi-SIM device 110 includes SIM#1 111, SIM#2 112, and RF resources 113. Although the multi-SIM device 110 in FIG. 1 includes only two SIMs, a multi-SIM device according to the present disclosure may include more SIMs, and methods and apparatuses of the present disclosure may be applied to a multi-SIM device having three or more SIMs.

The RF resources 113 may include a circuit, a path for transmitting or receiving a signal, and/or tangible or intangible (e.g. hardware or software) resources for processing transmitted/received signals. The RF resources 113 may be shared by SIM#1 111 and SIM#2 112. The RF resources 113 may be allocated to one of SIM#1 111 and SIM#2 112 for only one communication (transmission/reception). Each SIM needs the RF resources 113 to communicate with an external device. For example, when the RF resources 113 are allocated to SIM#1 111, SIM#1 111 can communicate with base station 120 which is the serving base station of SIM#1 111, and SIM#2 112 cannot communicate with base station 130 which is the serving base station of SIM#2 112.

SIM#1 111 and SIM#2 112 each repeat a sleep and wake-up period according to its DRX cycle. In its wake-up period, SIM#1 111 monitors a paging channel for a paging message 121 transmitted from base station 120. Likewise, in its wake-up period, SIM#2 112 monitors a paging channel for a paging message 131 transmitted from base station 130. Here, the paging messages 121 and 131 refer to a message that warns the SIM of an incoming voice or data call. Ideally, in each wake-up period of SIM#1 111, the RF resources 113 should be allocated to SIM#1 111 and, similarly, in each wake-up period of SIM#2 112, the RF resources 113 should be allocated to SIM#2 112.

However, SIM#1 111 and SIM#2 112 may each simultaneously enter the wake-up period, which may be referred to as collision of the allocation of the RF resources 113. Hereinafter, an example of a collision of the allocation of the RF resources will be described in more detail with reference to FIG. 2 below.

Figure 2:
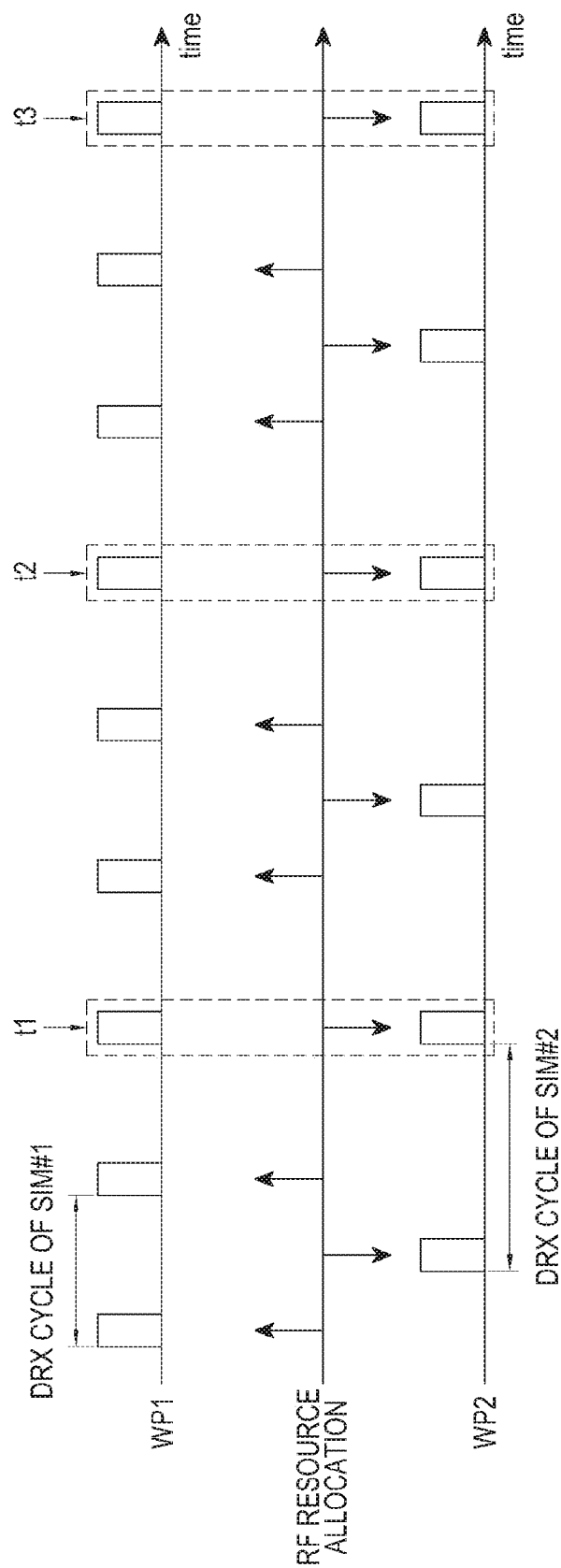
FIG. 2 illustrates a collision between RF resource allocations to two different SIMs in a multi-SIM device.

FIG. 2 illustrates an example of collisions of RF resources allocated to multiple SIMs in a multi-SIM terminal.

In FIG. 2, wake-up pattern WP1 of SIM#1 periodically repeats the DRX cycle of SIM#1 and wake-up pattern WP2 of SIM#2 periodically repeats the DRX cycle of SIM#2. Although the DRX cycles of SIM#1 and SIM#2 are different from each other, FIG. 2 is only an example, and the DRX cycles of SIM#1 and SIM#2 may be the same as each other according to some embodiments. The RF resources are allocated to SIM#1 as shown by the wake-up pattern WP1, and the RF resources are allocated to SIM#2 as shown by the wake-up pattern WP2.

However, since the wake-up periods of pattern WP1 of SIM#1 and the wake-up periods of pattern WP2 of SIM#2 temporally overlap each other at time points t1, t2, and t3, there is a collision of the allocation of RF resources at the time points t1, t2, and t3, leading to various possible problems.

For example, base station 120 in FIG. 1 may repeatedly transmit the paging message 121 to SIM#1 111 at the collision time points t1, t2, and t3, when the resources are allocated to SIM#2 112, resulting in SIM#1 111 missing all the repeated transmissions of the paging message 121 until finally receiving the repeated transmission after a delay. In this case, SIM#1 111 may recognize the existence of the incoming data or voice call late and thus the incoming data or voice reception may be delayed, or may not recognize the existence of the data or voice call at all and thus never receive the data or voice call.

Accordingly, an efficient RF resource allocation method that can solve these problems according to an embodiment of the present disclosure is described with reference to FIG. 3.

Figure 3:
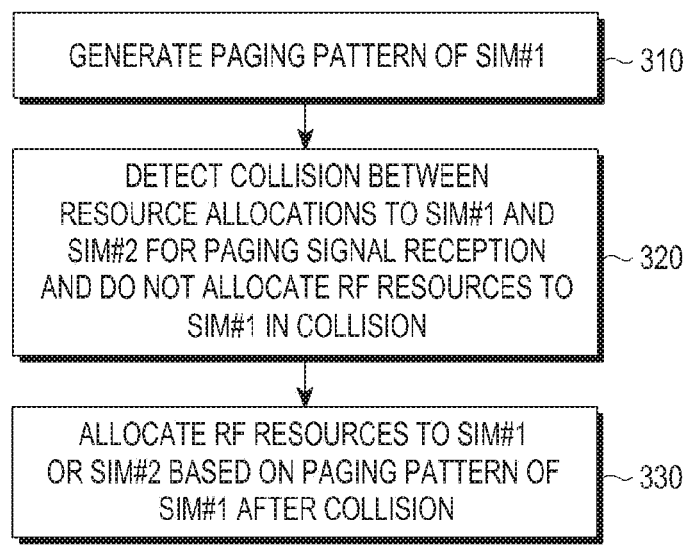
FIG. 3 is a flowchart illustrating a method of allocating RF resources to SIMs in a multi-SIM device for receiving paging messages according to an embodiment of the present disclosure.

FIG. 3 is a flowchart illustrating a method of allocating RF resources to SIMs in a multi-SIM device for receiving their respective paging messages according to an embodiment of the present disclosure.

In general, the method of allocating RF resources to SIMs (in this example, SIM#1 and SIM#2) to receive paging messages according to an embodiment of the present disclosure includes generating a paging pattern of SIM#1 in step 310, detecting a collision between RF resources allocations to SIM#1 and SIM#2 to receive their respective paging signals in step 320, wherein the resources are not allocated to SIM#1 during the collision, and, after the collision, allocating the RF resources to SIM#1 or SIM#2 based on the paging pattern of SIM#1 after the collision in step 330.

In step 310, the multi-SIM device generates a paging pattern of SIM#1. The paging pattern of SIM#1 indicates the opportunities of SIM#1 to receive the paging signal of SIM#1. The paging pattern may be generated by performing an OR operation on one or more sub-paging patterns. The sub-paging pattern may be generated based on sequences of received paging messages. For example, a base station may transmit sequences of paging messages according to a predetermined rule. The rule for transmitting the sequences of the paging messages may indicate the time period between transmissions of the paging messages and a number of repeated transmissions of the paging messages. The rule for transmitting the sequences of the paging messages may be different depending on, for example, a base station or equipment used for a network. Accordingly, different SIMs in a multi-SIM terminal may experience sequences of paging messages of more than one type. According to the sequences of the paging messages of one or more types, the multi-SIM device generates and stores one or more sub-paging patterns. Table 1 below shows information for sub-paging patterns stored in a multi-SIM device.

TABLE 1

| MCC | MNC | Sub-paging Pattern Index | Time | RAT | Paging Number | Intervals between paging signals |
|---|---|---|---|---|---|---|
| 450 | 06 | 1 | Feb. 16, 2016 | LTE | 4 | 4 sec-3 sec-2 sec |
| 450 | 06 | 2 | Mar. 2, 2016 | LTE | 3 | 3 sec-4 sec |
| ... | | | | | | |

Each row in Table 1 corresponds to a sub-paging pattern. In Table 1, through a combination of the Mobile Country Code (MCC) and the Mobile Network Code (MNC), a mobile network operator or a Public Land Mobile Network (PLMN) can be identified. Sub-paging patterns of the same MCC and MNC network may be used by one SIM using the corresponding mobile network operator/PLMN. The "pattern index" indicates an index of the sub-paging pattern. "Time" indicates when the sub-paging pattern was determined/measured or stored. The Radio Access Technology (RAT) indicates the type of technology/protocols provided by the network corresponding to the indicated MCC/MNC and may be, for example, Long Term Evolution (LTE), Code Division Multiple Access (CDMA), or Global System for Mobile Communication (GSM). The "Paging Number" indicates the number of paging signals in the sequence of paging signals of the sub-paging pattern. "Intervals between paging signals" indicates the time intervals between the transmissions of the paging signals in the sequence of the sub-paging pattern.

In order to generate a paging pattern for a SIM, a multi-SIM device according to an embodiment of the present disclosure recognizes sub-paging patterns which have the same MCC and MNC as the PLMN/mobile network operator that currently serves the SIM and then performs an OR operation on the recognized sub-paging patterns to generate the paging pattern for the SIM.

A method of generating a paging pattern from more than one sub-paging pattern according to an embodiment of the present disclosure is described in detail with reference to FIG. 4.

Figure 4:
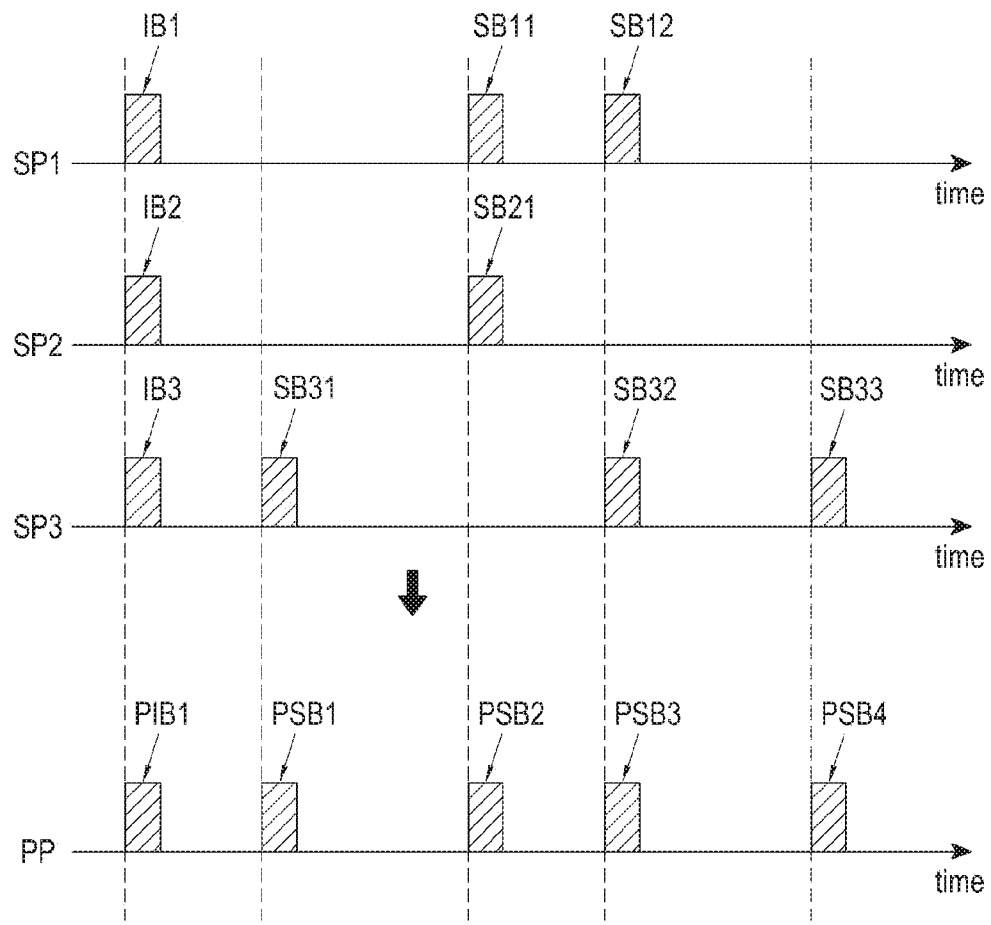
FIG. 4 illustrates the generation of paging patterns according to an embodiment of the present disclosure.

In FIG. 4, sub-paging patterns SP1, SP2, and SP3 correspond to the visualization of information on the transmission of paging signals indicated by "Paging Number" and "Intervals between paging signals" in a table (e.g. Table 1). Each of the sub-paging patterns SP1, SP2, and SP3 includes an initial paging block (IB) and one or more subsequent paging blocks (SBs) indicating transmission time points of the paging signals. For example, the first sub-paging pattern SP1 includes the initial paging block IB1 indicating the paging signal initially transmitted in the sequence of paging signals and subsequently transmitted paging blocks SB11 and SB12.

As shown at the bottom of FIG. 4, paging pattern PP is generated by performing an OR operation on the sub-paging patterns SP1, SP2, and SP3 above it. In the OR operation, the sub-paging patterns SP1, SP2, and SP3 are arranged or, equivalently, lined up, based on their initial paging blocks IB1, IB2, and IB3. The paging pattern PP resulting from the OR operation may be understood as indicating the transmission opportunities of all paging signals included in each of the sub-paging patterns SP1, SP2, and SP3. The paging pattern PP itself includes an initial paging block PIB1 and one or more subsequent paging blocks (e.g., PSB1, PSB2, PSB3, and PSB4 in FIG. 4).

Referring back to FIG. 3, in step 320 the multi-SIM device detects a collision between the RF resource allocations for SIM#1 and SIM#2 to receive their respective paging signals, wherein the RF resources are not allocated to SIM#1 during the collision period. For example, in step 320, the collision between the generated RF resource allocations, i.e., between WP1 and WP2, at the time point t1 of FIG. 2 may be detected.

In step 330 of FIG. 3, the multi-SIM device allocates the RF resources to SIM#1 or SIM#2 based on the paging pattern of SIM#1 after the collision. An example of this operation is described in detail below with reference to FIG. 5.

Figure 5:
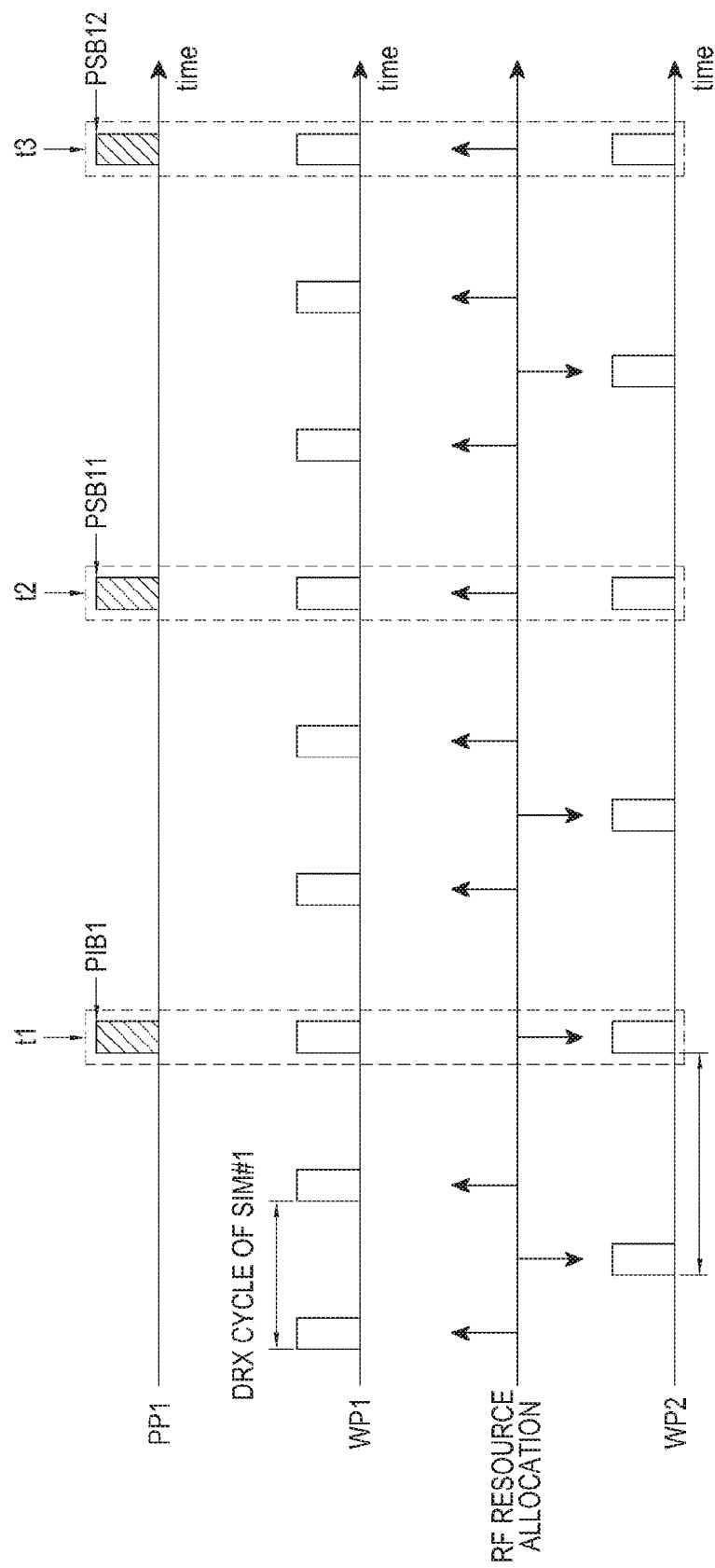
FIG. 5 illustrates the allocation of RF resources according to an embodiment of the present disclosure.

FIG. 5 illustrates the allocation of RF resources based on a paging pattern according to an embodiment of the present disclosure. In FIG. 5, a paging pattern PP1 of SIM#1 may be generated according to the method shown by the example described in FIG. 4. Wake-up pattern WP1 of SIM#1 and wake-up pattern WP2 of SIM#2 may be the same as those described in FIG. 2.

In FIG. 5, after the detected collision time point t1 where the RF resources are allocated to SIM#2, the RF resources are allocated to SIM#1 based on the paging pattern PP1. In paging pattern PP1, an initial paging block PIB1 corresponds to the detected collision time point t1 and the RF resources may be first allocated to SIM#1 at time points t2 and/or t3 of subsequent paging blocks PSB11 and PSB12, respectively. Although the time points t2 and t3 in FIG. 5 of the subsequent paging blocks PSB11 and PSB12, respectively, are also time points when there are collisions between allocations of the RF resources, the present disclosure is not necessarily limited thereto.

If there were no collision between the allocations of the RF resources at either of time points t2 and t3 of the subsequent paging blocks PSB11 and PSB12, respectively, the RF resources would remain allocated to SIM#1 at the corresponding time point. Since the paging pattern PP1 indicates all reception opportunities of the paging signals of SIM#1, even though the paging signal transmitted to SIM#1 is not received at the collision time point t1, it is possible to guarantee the rapid reception of the paging signal in the subsequently repeated transmissions of the paging signal by the RF resource allocation method according to the present disclosure, as shown by the example described in FIG. 5.

Figure 6:
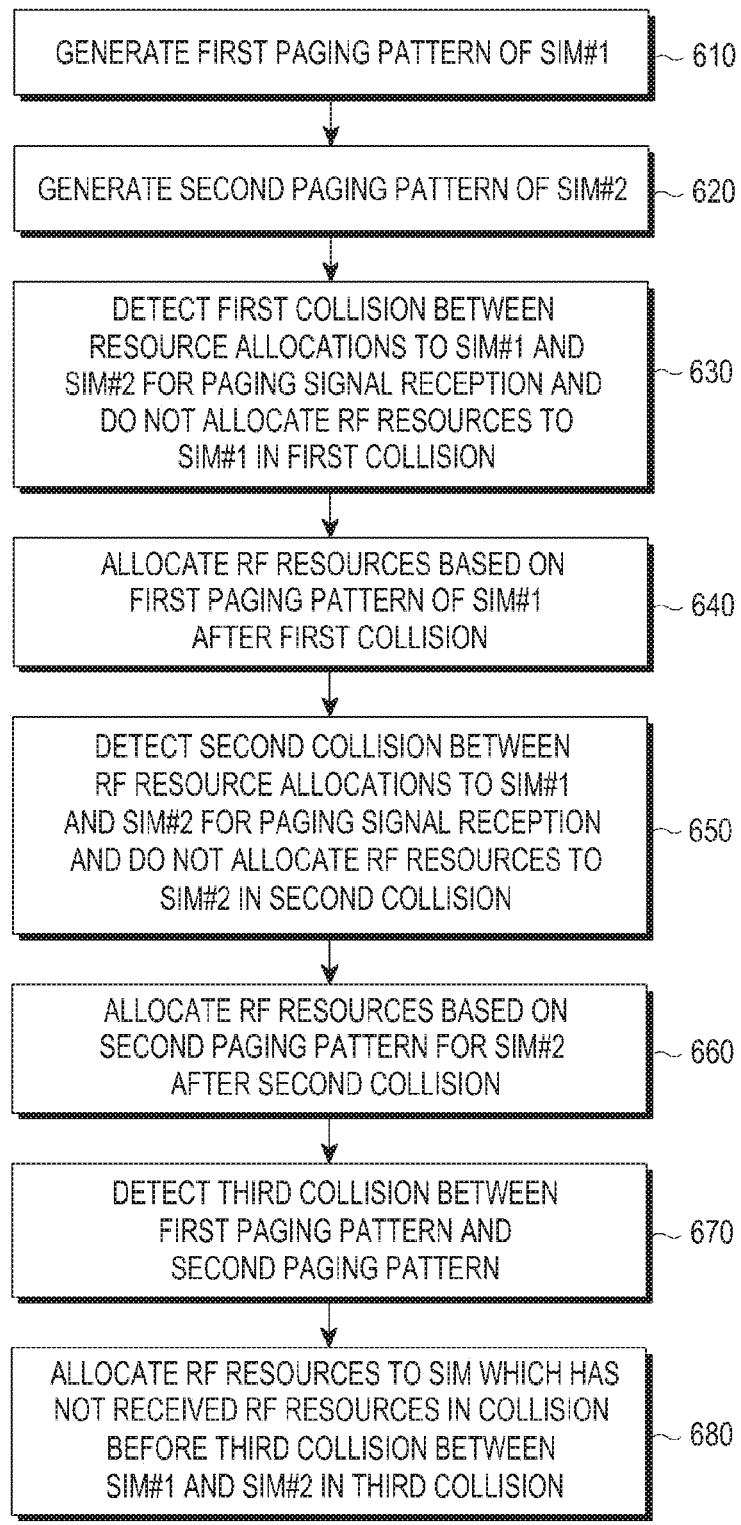
FIG. 6 is a flowchart illustrating a method of allocating RF resources to multiple SIMs in a multi-SIM device according to an embodiment of the present disclosure.
Figure 7:
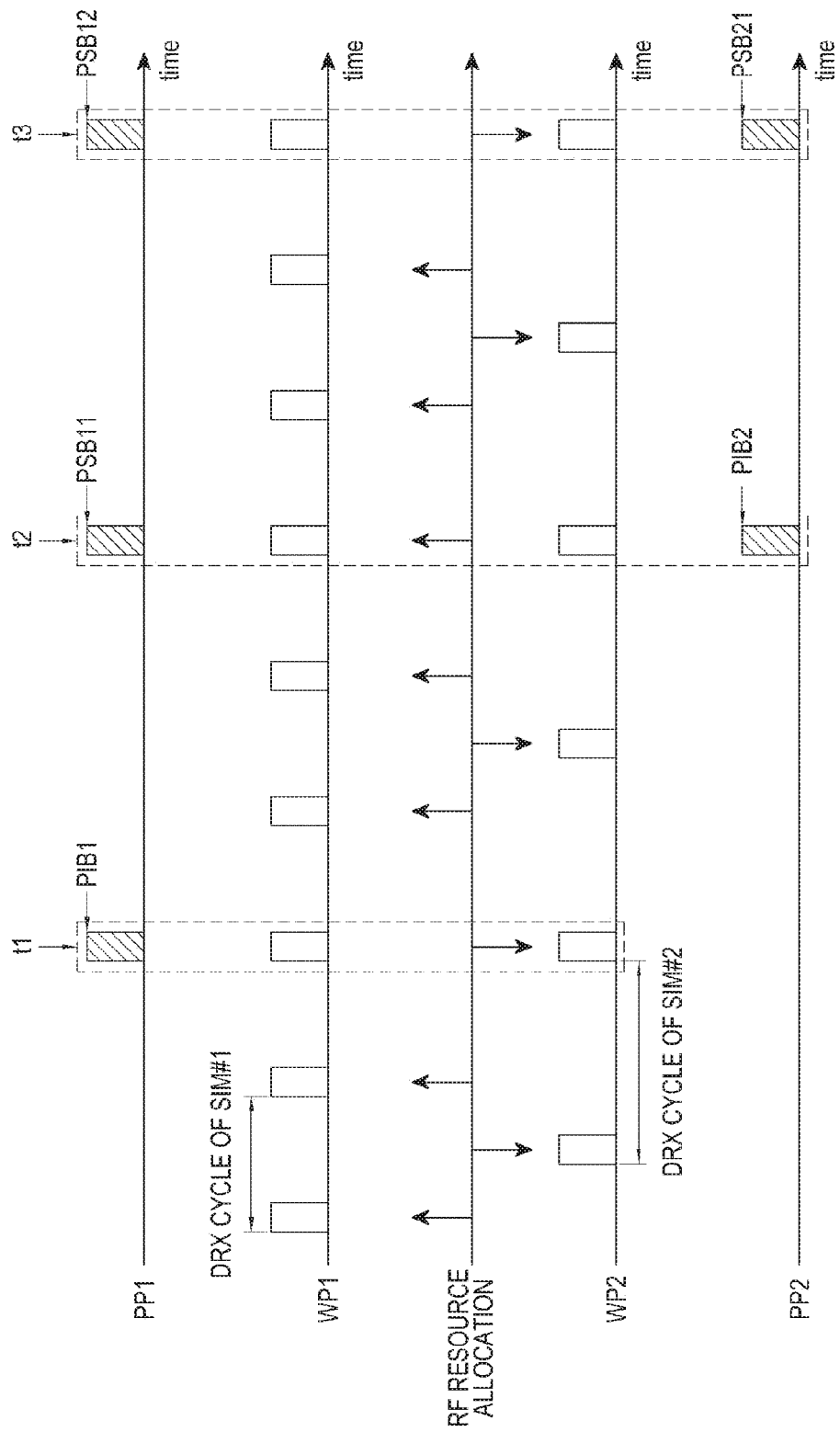
FIG. 7 illustrates the allocation of RF resources to multiple SIMs in a multi-SIM device according to an embodiment of the present disclosure.

Hereinafter, an RF resource allocation method when there are collisions between generated paging patterns is described with reference to FIGS. 6 and 7. FIG. 6 is a flowchart illustrating a method of allocating RF resources when there are collisions between paging patterns according to an embodiment of the present disclosure. FIG. 7 illustrates allocation of RF resources when there are collisions between paging patterns according to an embodiment of the present disclosure. In FIG. 7, the pertinent details about paging pattern PP1, wake-up pattern WP1, and wake-up pattern WP2 are substantially the same as the description of the same elements as referred to in FIGS. 2 and 5.

In step 610 of FIG. 6, the multi-SIM device generates a first paging pattern PP1 of SIM#. The first paging pattern PP1 of SIM#1 may be generated by substantially the same operation as the paging pattern was generated in step 310 of FIG. 3.

In step 620, the multi-SIM device generates a second paging pattern PP2 of SIM#2. The second paging pattern PP2 of SIM#2 may be generated by substantially the same operation as that used for generating the first paging pattern PP1.

In step 630, the multi-SIM device detects a first collision between the RF resource allocations of SIM#1 and SIM#2 for receiving the paging signal—i.e., in the example of FIG. 7, the collision between WP1 and WP2, respectively, at time t1 is detected. In the first collision, the resources are not allocated to SIM#1.

In step 640, the multi-SIM device allocates the RF resources based on the first paging pattern PP1 of SIM#1 after the first collision. The method of allocating the RF resources based on the first paging pattern PP1 in step 640 may be substantially the same as the method of allocating the RF resources based on the paging pattern described in step 330 of FIG. 3.

In step 650, the multi-SIM device detects a second collision between the RF resource allocations for SIM#1 and SIM#2 to receive their paging signals—i.e., in the example of FIG. 7, the collision between WP1 and WP2, respectively, at time t2 is detected. In the second collision, the resources are not allocated to SIM#2.

In step 660, the multi-SIM device allocates the RF resources based on the second paging pattern PP2 of SIM#2 after the second collision. In order to guarantee the reception of the paging signal of SIM#2 after the time point t2 of the second collision, the RF resources are first allocated to SIM#2 based on the second paging pattern PP2.

Referring to FIG. 7, the paging pattern PP2 of SIM#2 includes an initial paging block PIB2 and a subsequent paging block PSB21. The initial paging block PIB2 corresponds to the second collision time point t2 where the RF resources are not allocated to SIM#2. After the second collision time t2, the RF resources are first allocated to SIM#2, that is, in subsequent paging block PSB21.

In step 670, the multi-SIM device detects a third collision between the first paging pattern PP1 and the second paging pattern PP2. Referring to FIG. 7, the initial paging block PIB1 may correspond to the first collision time point t1, the arranged first paging pattern PP1 and the initial paging block PIB2 may correspond to the second collision time point t2, and the arranged second paging pattern PP2 may collide at the third collision time point t3. According to steps 640 and 660, a collision between RF resource allocations to SIM#1 and SIM#2 may be generated at the third collision time point t3.

In step 680, in order to resolve the collision between the RF resource allocations at the third collision time point t3, the multi-SIM device allocates the RF resources to the SIM which did not receive the RF resources in the previous collision. That is, the resources may be allocated to SIM#2 112, which has not received the RF resources at the second collision time point t2 corresponding to a collision time point before the third collision time point t3. Through such a scheme, the RF resources may be equally allocated to SIM#1 and SIM#2 regardless of the relative priorities of the RF resource allocation to SIM#1 based on the first paging pattern PP1 and the RF resource allocation to SIM#2 based on the second paging pattern PP2.

Below, methods for initiating an update and updating the paging pattern of a SIM in a multi-SIM device according to an embodiment of the present disclosure is described with reference to FIGS. 8 and 9, respectively.

Figures 8, 9:
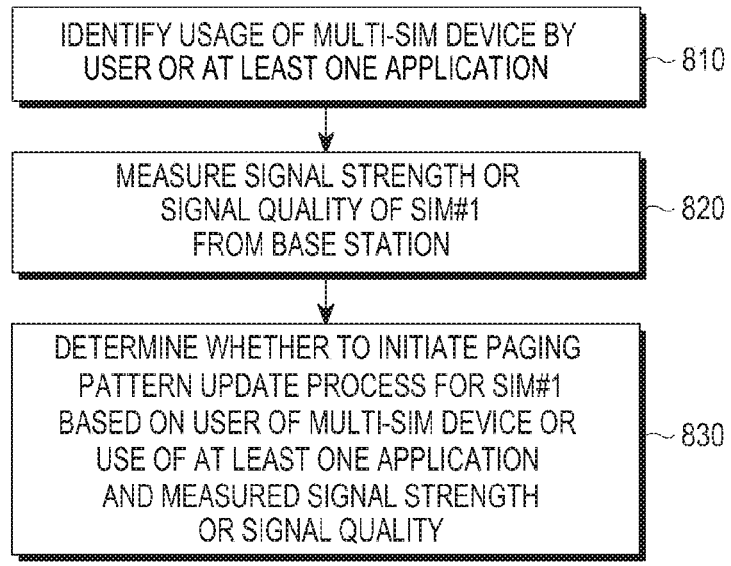
FIG. 8 is a flowchart illustrating a method of initiating a paging pattern update process for a SIM in a multi-SIM device according to an embodiment of the present disclosure.
FIG. 9 is a flowchart illustrating a process for updating the paging pattern of a SIM in a multi-SIM device according to an embodiment of the present disclosure.

FIG. 8 is a flowchart illustrating a method of initiating an update process of the paging pattern of a SIM in a multi-SIM device according to an embodiment of the present disclosure. In step 810, the multi-SIM device may identify the usage of the the multi-SIM device by a user or at least one application. Through step 810, the multi-SIM device can determine whether the paging pattern update process can be performed without disturbing the user or the at least one application.

In step 820, the multi-SIM device measures a signal strength or a signal quality of the signal for the SIM, e.g., SIM#1, from the base station. For example, the multi-SIM device may measure Reference Signal Received Power (RSRP) and/or Reference Signal Received Quality (RSRQ) of the base station serving the SIM to be updated. Through step 820, the multi-SIM device can determine whether the paging signal can be stably received in the paging pattern update process.

In step 830, the multi-SIM device determines whether to initiate the process for updating the paging pattern of the SIM (SIM#1) based on the identification of the usage of the multi-SIM device in step 810 and the signal strength or signal quality measured in step 820. More specifically, for example, when the multi-SIM device determines that the current usage of the multi-SIM device is small enough to perform the paging pattern update process without being disturbed and determines that the measured signal strength and/or signal quality is good enough to guarantee a stable reception of the paging signal, the multi-SIM device may determine to initiate the paging pattern update process.

FIG. 9 is a flowchart illustrating a process for updating the paging pattern of a SIM in a multi-SIM device according to an embodiment of the present disclosure. In step 910, the multi-SIM device transmits a message to the base station for triggering the base station to transmit a paging signal. More specifically, the multi-SIM device transmits a paging signal triggering message to the serving base station of the SIM to be updated (SIM#1).

In step 920, the multi-SIM device receives sequences of paging signals from the base station in response to the paging signal triggering message. The base station stops transmission of any additional paging signals when the multi-SIM device responds to the received sequences of paging signals. Therefore, in order to receive the sequences of the intact paging signals, the multi-SIM device may not respond to each of the paging signals received while the sequences of the paging signals are received.

In step 930, the multi-SIM device generates a sub-paging pattern based on the received sequences of the paging signals.

In step 940, the multi-SIM device updates one of at least one existing paging pattern of the SIM to be updated (SIM#1) based on the generated sub-paging pattern. More specifically, the multi-SIM device acquires MCC and MNC information by decoding the received paging signal, and determines if any of the existing sub-paging patterns have an MCC and MNC that match the MCC and MNC acquired from the decoded paging signal. If there is an existing sub-paging pattern having the same MCC and MNC as the MCC and MNC acquired from the received paging signal and that matches the sub-paging pattern generated in step 930, the multi-SIM device updates only the "time" of the corresponding existing sub-paging pattern to be the current time or the reception time of the sequences of the paging signals received in the paging pattern update process.

If there is no existing sub-paging pattern having the same MCC and MNC that matches the sub-paging pattern generated in step 930 and the number of stored existing sub-paging patterns is smaller than the number of paging patterns that can be stored in the multi-SIM device, the multi-SIM device stores the sub-paging pattern generated in step 930 as an additional existing sub-paging pattern. When there is no existing sub-paging pattern having the same MCC and MNC that matches the sub-paging pattern generated in step 930 and the number of stored existing sub-paging patterns is less than or equal to the number of paging patterns that can be stored in the multi-SIM device, the multi-SIM device replaces the existing sub-paging pattern having the oldest "time" with the sub-paging pattern generated in step 930.

According to some embodiments, the sub-paging patterns of individual SIMs in a multi-SIM device may be stored separately or may not be updated. For example, a multi-SIM device may generate the paging pattern of SIM#1 from the sub-paging patterns having MCCs and MNCs that match the MCC and MNC of the serving PLMN of SIM#1 and also generate the paging pattern of SIM#2 in the same way. As another example, the sub-paging patterns of SIM#1 and the sub-paging patterns of SIM#2 may not be stored separately when SIM#1 and SIM#2 are served by the same PLMN, thereby reducing the amount of memory usage in the multi-SIM device.

Figure 10:
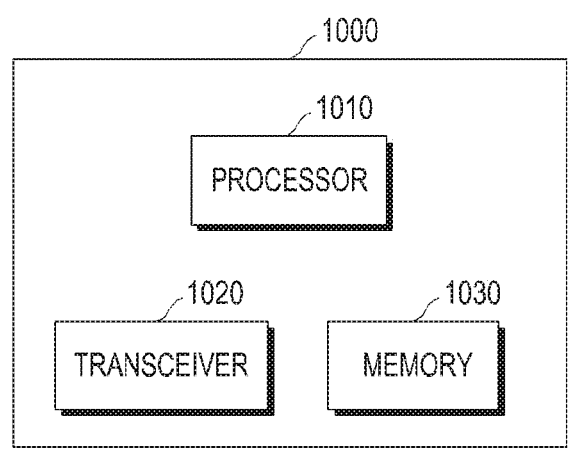
FIG. 10 is a block diagram illustrating a multi-SIM device according to an embodiment of the present disclosure.

FIG. 10 is a block diagram illustrating a multi-SIM device according to an embodiment of the present disclosure.

The multi-SIM device 1000 of FIG. 10 can perform the operations described in relation to FIGS. 1 through 9. The multi-SIM device 1000 includes a transceiver 1020, a memory 1030, and a processor 1010 that is electrically coupled to, and can communicate with, the transceiver 1020 and the memory 1030. The multi-SIM device 1000 transmits and receives signals and communicates with other entities through the transceiver 1020. The memory 1030 stores information for, inter alia, the operations of the multi-SIM device 1000. For example, the aforementioned sub-paging patterns and instructions or codes for controlling the processor 1010 to perform one or more operations may be stored in the memory 1030.

The processor 1010 can control the operations of the multi-SIM device 1000. The operations of the multi-SIM device described in relation to FIGS. 1 through 9 may be processed and executed substantially by the processor 1010. Although transmission and reception of the signals are performed by the transceiver 1020 and storage of the sub-paging patterns is performed by the memory 1030, those operations of the transceiver 1020 and the memory 1030 may be controlled by the processor 1010. In this manner, the transmission and the reception of the signals and the storage of the sub-paging patterns may also be considered to be performed by the processor 1010 and may be referred to in this application as such.

At least some of the multi-SIM device 1000 may be implemented as a chip or a chip set. For example, each of the processor 1010, the transceiver 1020, and the memory 1030 may be implemented as a single chip, at least some of the processor 1010, the transceiver 1020, and the memory 1030 may be implemented as one integrated chip, or at least some of the processor 1010, the transceiver 1020, and the memory 1030 may be implemented on separate chips.

Those skilled in the art will recognize that various logic blocks, modules, circuits, methods, and algorithms described in connection with the examples disclosed herein may be implemented as electronic hardware, computer software, or a combination thereof. Recognizing the interchangeability of hardware and/or software in terms of functionality, various components, blocks, modules, circuits, and the like have been generally described herein in terms of the functionality thereof. Whether such functionality is implemented in hardware and/or software depends on the specific application and design limitations imposed on the total system. Those skilled in the art can use a variety of ways to realize the described functionalities for each specific application, and such realizations are within the scope of the present disclosure.

The various illustrative logic blocks, modules, circuits, and functionalities described in connection with the embodiments disclosed herein can be implemented using, for example, the following components: a general-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination of these components. The general-purpose processor can be a microprocessor or, alternatively, the processor can be any general processor, controller, microcontroller, or processing device acting as a state machine. The processor can also be a combination of computing devices, for example, a combination of DSP and microprocessor, multiple microprocessors, one or more microprocessors combined with a DSP core, or any other such configurations.

As mentioned above, any methods or algorithms described in connection with the embodiments disclosed herein may be implemented in hardware, in software, or in any combination thereof. The software may be stored in a Random Access Memory (RAM), a flash memory, a Read Only Memory (ROM), an Erasable Programmable ROM (EPROM), an Electrically EPROM (EEPROM), registers, a hard disc, a removable disc, a Compact Disc (CD)-ROM, or any technically known storage medium having the appropriate capabilities, as would be understood by one of ordinary skill in the art. Any such storage medium is coupled to at least one processor which can read information from the storage medium and write information to the storage medium. Alternatively, the storage medium can be integrated into the processor. For example, the processor and the storage medium can reside within an Application Specific Integrated Circuit (ASIC).

As mentioned above, the functions described herein may be implemented in hardware, software, firmware, or any combination of thereof. When the functions are implemented in software, the functions may be stored as one or more instructions or codes in a non-transitory computer-readable medium. The non-transitory computer-readable medium can easily transfer a computer program from one place to another place and can be accessed by a general-purpose or special-purpose computer. By way of example, and not limitation, such a computer-readable medium can include RAM, ROM, EEPROM, CD-ROM, laser disk, Digital Versatile Disk (DVD), Blu-ray disk or other optical disk storage, a floppy disk or any other magnetic storage devices, or other media that can be used to store desired program code in the form of instructions or data structures and that can be accessed by a general-purpose or special-purpose computer or a general-purpose or special-purpose processor. Further, a computer-readable medium can have a predetermined access means. For example, when the software is transmitted from a website, server, or other remote source using a coaxial cable, fiber optic cable, twisted pair, Digital Subscriber Line (DSL), or wireless technologies such as infrared, radio, and microwave, the coaxial cable, fiber optic cable, twisted pair, DSL, or wireless technologies such as infrared, radio, and microwave are included in the definition of computer-readable medium. Combinations of any of the above are also included within the scope of computer-readable medium.

While embodiments of the present disclosure have been described with reference to the accompanying drawings, it will be understood by those of ordinary skill in the art that specific implementations may be varied and modified without departing from the scope of the present disclosure. Accordingly, it should be understood that the embodiments described above are merely examples for purposes of description and do not limit the present disclosure in any respect. The scope of the present disclosure is limited solely by the following claims and their equivalents.

What is claimed is:

1. A method of receiving a paging signal by a multi-Subscriber Identification Module (SIM) device including at least a first SIM and a second SIM, the method comprising:
   generating at least two sub-paging patterns of the first SIM based on at least two sequences of paging signals for the first SIM;
   generating a paging pattern of the first SIM by performing OR operation on the at least two sub-paging patterns of the first SIM;
   detecting a first collision between Radio Frequency (RF) resource allocations to the first SIM and the second SIM for receiving the paging signal, wherein RF resources are not allocated to the first SIM in the collision; and
   allocating the RF resources to the first SIM or the second SIM based on the generated paging pattern of the first SIM after the first collision.

2. The method of claim 1, wherein allocating the RF resources after the first collision comprises:
   allocating the RF resources first to the first SIM based on the generated paging pattern of the first SIM after the first collision.

3. The method of claim 2, wherein the paging pattern of the first SIM includes an initial paging block and at least one subsequent paging block, where a time point of the collision corresponds to a time point of the initial paging block, and
   wherein allocating the RF resources first to the first SIM after the first collision comprises:
   first allocating the RF resources to the first SIM at a time point of the at least one subsequent paging block.

4. The method of claim 1, wherein generating the at least two sub-paging patterns comprises:
   generating a table containing, for each of the at least two sub-paging patterns, one or more of an MCC (mobile country code), an MNC (mobile network code), an index, a time when a corresponding sub-paging pattern is measured or stored, a RAT (radio access technology), a number of paging signals in a sequence, and at least one interval between the paging signals in the sequence.

5. The method of claim 1, further comprising:
   identifying usage of the multi-SIM device by a user or at least one application;
   measuring at least one of a signal strength or a signal quality of the first SIM from a base station; and
   determining whether to initiate an update process of the paging pattern of the first SIM based on the identified usage of the multi-SIM device and the measured at least one of signal strength or signal quality.

6. The method of claim 5, wherein the update process of the paging pattern of the first SIM comprises:
   transmitting a paging signal triggering message to the base station;
   receiving sequences of paging signals from the base station in response to the paging signal triggering message, wherein the multi-SIM device does not respond to each of the paging signals;
   generating a sub-paging pattern based on the received sequences of the paging signals; and
   updating one of at least one existing sub-paging pattern using the generated sub-paging pattern.

7. The method of claim 1, further comprising:
   generating a paging pattern of the second SIM;
   detecting a second collision between RF resource allocations to the first SIM and the second SIM for receiving their respective paging signals, wherein the RF resources are not allocated to the second SIM at the time of the second collision; and
   allocating the RF resources to the first SIM or the second SIM additionally based on the generated paging pattern of the second SIM after the second collision.

8. The method of claim 7, wherein the paging pattern of the first SIM includes a first initial paging block and at least one first subsequent paging block, where a time point of the collision corresponds to a time point of the first initial paging block,
  wherein the paging pattern of the second SIM includes a second initial paging block and at least one second subsequent paging block, where a time point of the second collision corresponds to a time point of the second initial paging block, and
  wherein allocating of the RF resources to the first SIM or the second SIM additionally based on the generated paging pattern of the second SIM after the second collision comprises:
    when a third collision between one of the at least one first subsequent paging block and one of the at least one second subsequent paging block is detected, allocating the RF resources to the SIM which did not receive the RF resources in a collision before the third collision.

9. A multi-Subscriber Identification Module (SIM) device including at least a first SIM and a second SIM, the multi-SIM device comprising:
  a transceiver;
  a memory; and
  a processor coupled to the transceiver and the memory,
  wherein the processor is configured to:
    generate at least two sub-paging patterns of the first SIM based on at least two sequences of paging signals for the first SIM;
    generate a paging pattern of the first SIM by performing OR operation on the at least two sub-paging patterns of the first SIM;
    detect a first collision between Radio Frequency (RF) resource allocations to the first SIM and the second SIM for receiving their respective paging signals, wherein the RF resources are not allocated to the first SIM at a time of the first collision; and
    allocate the RF resources to the first SIM or the second SIM based on the generated paging pattern of the first SIM after the first collision.

10. The multi-SIM device of claim 9, wherein the processor is configured to allocate the RF resources first to the first SIM based on the generated paging pattern of the first SIM after the first collision.

11. The multi-SIM device of claim 10, wherein the paging pattern of the first SIM includes an initial paging block and at least one subsequent paging block, where a time point of the first collision corresponds to a time point of the initial paging block, and the processor first allocates the RF resources to the first SIM at a time point of the at least one subsequent paging block.

12. The multi-SIM device of claim 9, wherein the processor is further configured to generate the at least two sub-paging patterns by generating a table containing, for each of the at least two sub-paging patterns, one or more of an MCC (mobile country code), an MNC (mobile network code), an index, a time when a corresponding sub-paging pattern is measured or stored, a RAT (radio access technology), a number of paging signals in a sequence, and at least one interval between the paging signals in the sequence.

13. The multi-SIM device of claim 9, wherein the processor is further configured to identify usage of the multi-SIM device by a user or at least one application, measure at least one of a signal strength or a signal quality of the first SIM from a base station, and determines whether to initiate an update process of the paging pattern of the first SIM based on the identified usage of the multi-SIM device and the measured at least one of signal strength or the signal quality.

14. The multi-SIM device of claim 13, wherein the processor is further configured perform an update process of the paging pattern of the first SIM by:
  transmitting a paging signal triggering message to the base station;
  receiving sequences of paging signals from the base station in response to the paging signal triggering message, the multi-SIM device not responding to each of the paging signals;
  generating a sub-paging pattern based on the received sequences of the paging signals; and
  updating one of at least one existing sub-paging pattern using the generated sub-paging pattern.

15. A chip for a multi-Subscriber Identification Module (SIM) device comprising at least a first SIM and a second SIM, the chip configured to:
  generate at least two sub-paging patterns of the first SIM based on at least two sequence of paging signals for the first SIM,
  generate a paging pattern of the first SIM by performing OR operation on the at least two sub-paging patterns of the first SIM,
  detect a first collision between Radio Frequency (RF) resource allocations to the first SIM and the second SIM for receiving their respective paging signals, wherein the RF resources are not allocated to the first SIM at a time of the first collision, and
  allocate the RF resources to the first SIM and the second SIM based on the generated paging pattern of the first SIM after the first collision.

16. The chip of claim 15, wherein the chip is further configured to allocate the RF resources first to the first SIM based on the generated paging pattern of the first SIM after the first collision.

17. The chip of claim 16, wherein the paging pattern of the first SIM includes an initial paging block and at least one subsequent paging block, where a time point of the collision corresponds to a time point of the initial paging block, and the chip first allocates the RF resources after the first collision to the first SIM at a time point of the at least one subsequent paging block.

18. The chip of claim 15, wherein the chip is further configured to generate the at least two sub-paging patterns by generating a table containing, for each of the at least two sub-paging patterns, one or more of an MCC (mobile country code), an MNC (mobile network code), an index, a time when a corresponding sub-paging pattern is measured or stored, a RAT (radio access technology), a number of paging signals in a sequence, and at least one interval between the paging signals in the sequence.

19. The chip of claim 15, wherein the chip is further configured to:
  identify usage the multi-SIM device by a user or at least one application;
  measure at least one of a signal strength or a signal quality of the first SIM from a base station; and
  determine whether to initiate an update process of the paging pattern of the first SIM based on the identified usage of the multi-SIM device and the measured at least one of signal strength or signal quality.

20. The chip of claim 19, wherein the chip is further configured to perform an update process of the paging pattern of the first SIM by:

transmitting a paging signal triggering message to the base station;
receiving sequences of paging signals from the base station in response to the paging signal triggering message, the multi-SIM device not responding to each of the paging signals;
generating a sub-paging pattern based on the received sequences of the paging signals; and
updating one of at least one existing sub-paging pattern using the generated sub-paging pattern.

* * * * *